United States Patent [19]
Marti Sala

[11] Patent Number: 6,079,546
[45] Date of Patent: Jun. 27, 2000

[54] METHOD FOR CARRYING CONTAINERS SUCH AS BOTTLES AND THE LIKE, AND PLANT FOR ITS IMPLEMENTATION

[76] Inventor: Jaime Marti Sala, C/Emancipacion, 8, Barcelona 08017, Spain

[21] Appl. No.: 08/980,007

[22] Filed: Nov. 26, 1997

[30] Foreign Application Priority Data

Nov. 26, 1996 [ES] Spain ................................ 9602494

[51] Int. Cl.$^7$ ................................................ B65G 29/00
[52] U.S. Cl. ............................... 198/465.1; 198/803.14; 198/397
[58] Field of Search ........................... 198/803.14, 465.1, 198/464.4, 397

[56] References Cited

U.S. PATENT DOCUMENTS

| | | | |
|---|---|---|---|
| 3,090,478 | 5/1963 | Stanley | 198/131 |
| 3,941,237 | 3/1976 | MacGregor, Jr. | 198/41 |
| 4,305,496 | 12/1981 | Hoppmann et al. | 198/420 |
| 4,681,209 | 7/1987 | Marti | 198/392 |
| 5,065,852 | 11/1991 | Marti | 198/392 |
| 5,769,203 | 6/1998 | Marti Sala | 198/803.14 |

FOREIGN PATENT DOCUMENTS

| | | |
|---|---|---|
| 0432081 | 6/1991 | European Pat. Off. . |
| 8609116 | 12/1986 | Spain . |

*Primary Examiner*—Christopher P. Ellis
*Assistant Examiner*—Gene O. Crawford
*Attorney, Agent, or Firm*—Jacobson, Price, Holman & Stern, PLLC

[57] ABSTRACT

Method for carrying containers, such as bottles and the like, and a plant for its implementation. The containers being firstly uprightly oriented by positioning machines, and then alternatively loaded on housing members which move interfering with the outlet of the machines. Thereafter performing a transfer of containers, from the members, within elements having a stable bottom, previously loaded on the members. Finally the set of containers and elements proceed to be taken apart and move finally the sets to conveyor for its transfer to other machines for further treatments.

16 Claims, 2 Drawing Sheets

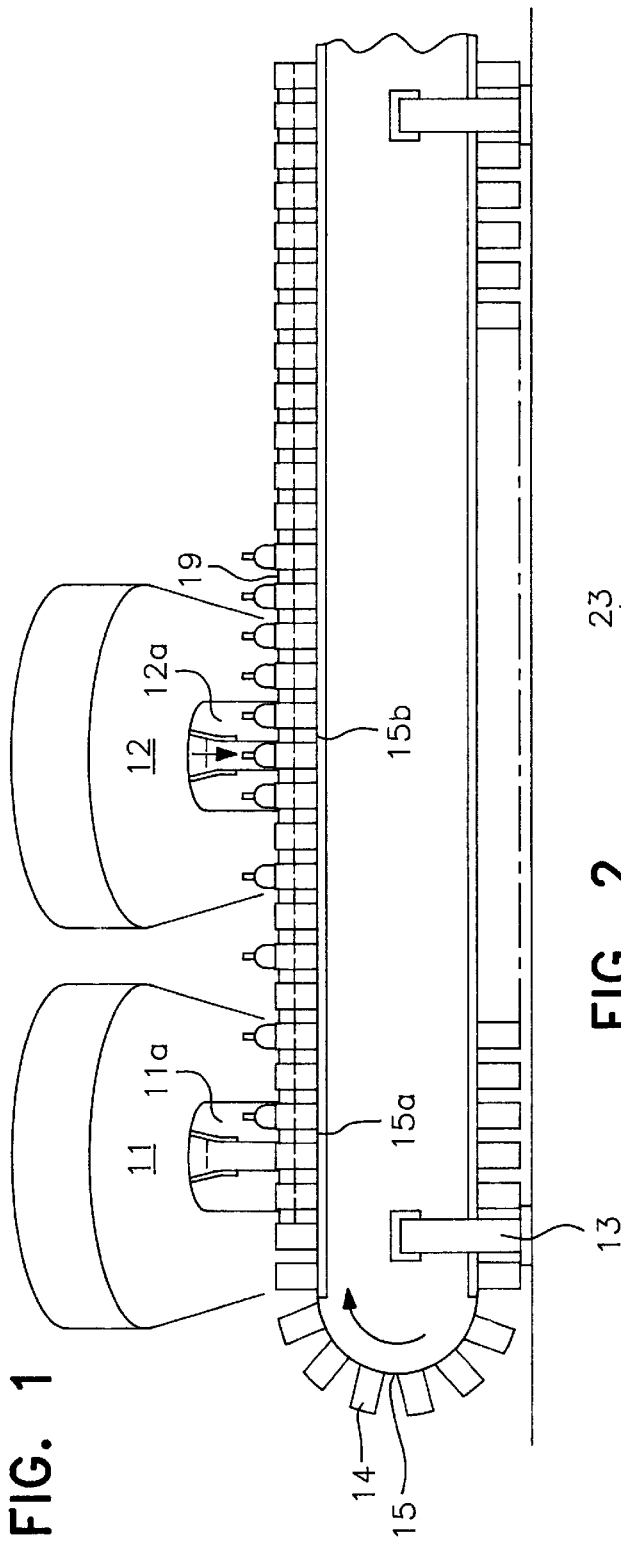
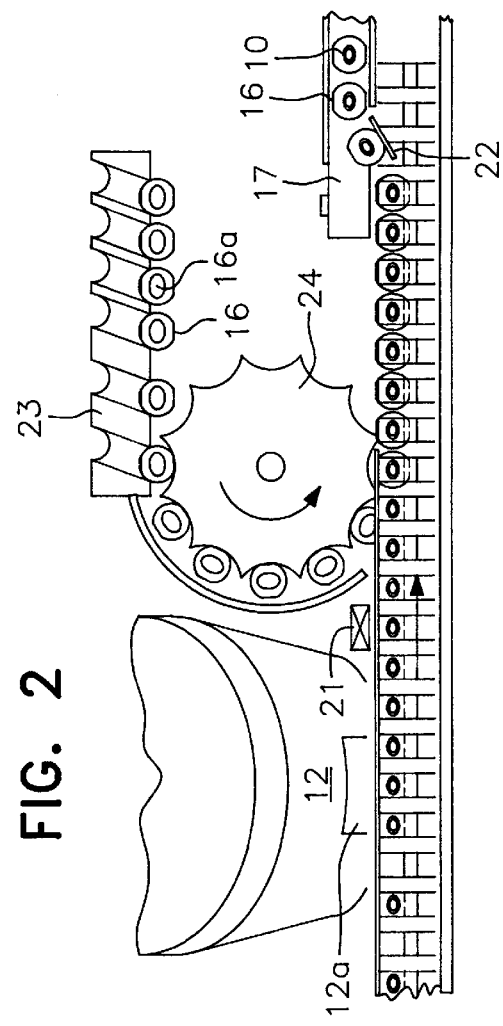
FIG. 1
FIG. 2

METHOD FOR CARRYING CONTAINERS SUCH AS BOTTLES AND THE LIKE, AND PLANT FOR ITS IMPLEMENTATION

BACKGROUND OF THE INVENTION

This invention refers to a method and an installation for carrying unstable containers such as bottles and the like, (namely slight containers having a small supporting bottom) said containers being positioned with a predetermined, generally upright, orientation by means at least of one automatic positioning machine, well-known in itself, as disclosed in U.S. Pat. No. 4,681,209 and EP 0432081 owned by the applicant. Said positioning machines are designed for supplying, aligned and uprightly oriented containers, such as plastic bottles, by means of a conveyor belt which transfers them to a treatment station, for example a labelling, filling etc. station and they are only fit in principle to treat flat bottom containers, of a sufficiently large size.

In the patent ES 8609116 an alternative is proposed to treat by means of machines of the above type, containers having a bottom which is not flat, which consists in an overhead carrier which picks up containers by their neck between two coplanar roll-on belts. Although this solution provides good results it demands the use of a non-standard conveyor along the whole container supplying line.

In order to achieve the container's supply by means of a standard conveyor, the method according to the invention proposes the use of some auxiliary elements, to house the containers during their carriage, such as empty pucks having a large bottom.

The idea of using pucks having a stable bottom fit to house the containers for their transfer, loaded within said pucks, in an in-line production equipment is disclosed in U.S. Pat. No. 3,941,237 and U.S. Pat. No. 3,090,478, document U.S. Pat. No. 4,305,496 discloses a method to carry a plurality of single containers 18 from a centrifugal rotating feeder 20 to a position in which said containers are left to drop in respective pucks 12 in a loading area. Containers 18 are oriented by a centrifugal rotating feeder 20 and fed to notches 22 provided on the periphery of said centrifugal feeder 20, being supported at the lower end by an arcuate-sector-shaped fixed floor 26 under feeder's 20 periphery. Under said floor 26 a plurality of empty pucks 12 are fed by a conveyor 28 and through an endless rotating belt 10 and an arcuate handrail 30 sector up to a loading area where empty pucks collect containers 18 and from there onward they travel on a circular path up to an unloading area approximately opposite to the filling or loading area. supporting fixed floor 26 extends only in part under feeder's 20 peripheral area in order that the end thereof (FIG. 6 and 9), at dropping area, containers 18 pass outside plane 26 and within pucks openings on conveyor belt 10 along dropping area and up to unloading area where loaded pucks are shifted from element 10 and guided up to an outlet endless conveyor 36 by a deflector bar 32. Empty pucks go on their way on conveyor belt 10 on a circular path to go back to the feeding area.

But in this background of U.S. Pat. No. 4,305,496, no solution is provided or even suggested to the problem of linking recirculated empty pucks to empty pucks which arrive to the loading area fed by conveyor 28 and this is evidenced because in a second further patent of same applicant, U.S. Pat. No. 4,723,661 referring to a mechanism to achieve said method, a very complex, expensive and bulky plant to reach such aim is disclosed. Another problem, not considered by said two backgrounds is to guarantee that on the area where the containers fall from the centrifugal feeder fixed supporting plane, said containers adopt a specific position in order to be coincident with the openings provided in the pucks, which is especially important in the event of flat containers such as flattened plastic bottles.

In addition, said two patents, U.S. Pat. No. 3,941,237 and U.S. Pat. No. 3,090,478, start from the principle of carrying said empty pucks to a meeting point with a positioning machine, from which containers are transferred to the interior of said pucks.

BRIEF SUMMARY OF THE INVENTION

On the contrary, the object of this invention provides a method and a plant to carry containers such as stable containers (flattened bottles, having uneven sections, small bottom, etc.) in particular in an upright position, which overcome the above drawbacks, on the grounds of a radically different concept, because containers are now collected by housing elements, associated to a conveyor, from one or more positioning machines, and thereafter they are transferred from said members to the interior of the pucks, previously loaded on said members, to finally have the sets of pucks-container leaving said housing members and pass to a conventional conveyor. In particular, detecting means have been provided and applied to determine whether a particular housing member received a container, and, if affirmative, they provide the transfer of an empty puck to the interior of a related member, in order that within it the insertion of the container in the puck's recess is performed.

The characteristics of the method and plant of this invention, as well as the advantages they contribute will clearly appear from the description below drawn up with the assistance of an example of and embodiment, solely referred to as illustrative and not a limitative embodiment, according to the following details.

BRIEF DESCRIPTION OF THE DRAWINGS

FIG. 2 is a part plan-view of the plant shown in FIG. 1, with details of bottle collecting sectors, puck's collection, former ones transfer to the interior of later ones and evacuation to a conventional conveyor for the set of pucks-bottle, in stabile conditions.

Finally.

DETAILED DESCRIPTION

Figure 1A:
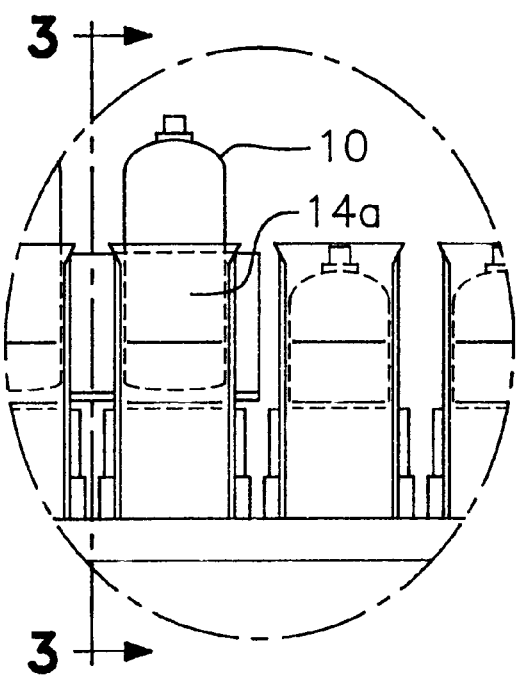
FIG. 1 is a side elevation view of a plant based on the principles of the invention, in which, enlarged to a much larger scale, in FIG. 1A, is shown the container transfer area from the interior of carrying auxiliary pucks, in this case plastic bottles, in the interior of the pucks for their further carriage in stable conditions.

According to these figures, the plant which is disclosed includes:

means for collecting containers (10) which go out duly positioned, from one or more machines (11, 12) already well-known (the means can have a general frame and loading methodology similar to those defined in the U.S. patent application Ser. No. 08/555,751 owned by the applicant);

means for transferring each container (10), thereafter, to a recess of a related element (16) having a stable bottom, and means to carry said elements (16), with a container (10) inserted, to other machines for a further treatment.

Thus, as it can be noted in FIG. 1 and 2, said means to collect containers (10) consist in a conveyor (15) supported on a support (13), with a sector (15a, 15b) which interferes, in the event of the illustrated example, with the outlet (11a, 12a) of two machines (11, 12) for positioning containers (10) in upright orientation, said conveyor (15) having a plurality of members (14) linked to house the containers.

The plant includes:

a fixed horizontal plane (18), which extends above a length of said conveyor (15) and remains partly introduced in members (14) (see FIG. 3) determining a temporary division thereof into two parts, top (14a) and bottom (14b), constitutive of said means to transfer containers (10) within elements (16);

means (21) (of conventional type and fit to containers characteristics, color, opacity or transparency, etc.) detecting the existence of a container (10), at the top (14a) of each said members (14), during its displacement;

means (23, 24) to supply, in the event a container (10) is detected at the top part (14a) of the member (14), a puck (16) having a stable bottom, with an opening (16a) and recess fit to house said container (10), to the bottom part (14b), of said member, downstream container (10) loading area;

shifting means (22) to pick up pucks (16) loaded with containers (10), of said conveyor (15), and to transfer it to another conveying line (17).

Figure 3:
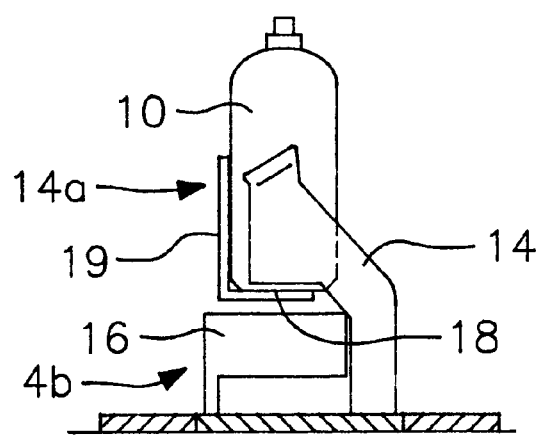
FIG. 3 is a side cross section of housing means split into two differentiated parts by a horizontal plane which extends above a portion of the conveyor.

As it can be noted in FIG. 3, said members (14) to house containers (10) include a back wall and two side walls which have openings, directly facing each other which allow part insertion, within the member (14) of the horizontal plane (18), which is interrupted at a point located beyond the puck (16) loading area at the top (14a) of said members (14) a handrail (19) having being provided which actively helps to temporarily keep containers (10) at said top (14a) of the members (14).

Means to provide pucks (16) to the bottom (14b) of members (14) consist, as drawn at FIG. 2 in a star (24) at the points of which concave housings have being defined, the periphery of which is tangent to the conveyor (15) and rotation synchronized with said conveyor (15) speed, and an endless screw (23) driven by the orders of said detecting means (21) for driven introduction of pucks (16), to said star, which transfers them to a related recess (14a).

The method according to the invention consists in the following basic steps:

containers (10) being picked up by housing members (14) which are moving, interfering with said machines (11, 12) outlet;

containers (10) being transferred from those members (14), within elements (16) having a stable bottom;

taking apart containers (10) inserted in said elements (16), and transferring each set (16, 10) to other machines for further treatments.

According to the preferred embodiment of the invention, the transfer of containers (10) within elements (16) is performed, during those members (14) displacement and within them, with differentiated load, in two steps, of containers (10) and elements (16) to said members (14), and temporary taking apart thereof.

As it is mentioned when referring to the characteristics of the plant, said elements (16) consist in pucks with an opening (16a) and a recess fit to house a related container (10).

In the implemented method with means disclosed at FIG. 1 to 3, above explained, containers (10) are uprightly positioned by means of at least one positioning machine (11, 12), already well-known (cited in U.S. Pat. No. 4,681,209 and EP 0432081) and it includes essentially the following operations:

loading conveniently oriented containers (10), from said machines to housing members (14) associated to a conveyor (15), which includes an interference sector (15a, 15b) with said machines (11, 12) outlets, and temporary servicing of said containers (10), keeping their upright orientation, at a top (14a) of said members (14).

detecting the existence or not of a container (10) at each of said members (14), after its interference with the machine (11, 12);

transfer beyond the interference sector (15a, 15b), in the event of detecting a container (10), a puck (16) at a bottom (14b) of said members (14), loaded with a container;

unloading, within members (14), containers (10) from said top (14a), within the pucks (16);

picking up the pucks (16), loaded with the container (10), of said members (14) and shift of the set of pucks-container (16, 10) to another conveying line (17).

Provisionally keeping the containers (10) at the top (14a) of the members (14) is obtained by means of the horizontal, fixed plane or profile (18) (FIG. 3), which is superposed to a conveyor (15) length and partly intercalates at said members (14), during their displacement, supporting containers (10) by their bottom, said plane (18) has an interruption (enlarged sector of FIG. 1) which determines where the containers (10) drop within the pucks (16), previously loaded at the bottom (14b) of said members (14).

As it can be seen at said FIG. 1, the transfer of pucks (16) within members (14) occurs at a point prior to the end of the plane (18), in order that, when the container (10) falls, there exists a puck (16) to collect it.

In a preferred embodiment of the method, it has been foreseen that it includes two or more machines (11, 12), which alternatively load containers (10) in one or the other of respective adjacent housing members (14), according to the principle disclosed in above U.S. patent application Ser. No. 08/555,751.

It is stated that the invention can be carried out with different means, alternative to those illustrated but on the grounds of its same essence.

I claim:

1. Method for carrying unstable containers, said containers being positioned with a predetermined orientation by at least one automatic positioning machine, said method including the following steps:

picking up the containers by housing members moving past said at least one automatic positioning machine on a conveyor;

detecting the existence of a container at each of said housing members, after the housing member have moved past the at least one automatic positioning machine;

transferring the containers from the housing members to an interior of elements having a stable bottom, the elements being transferred to a bottom of the housing members upon detection of a container, said elements including pucks with an opening and a recess fit to house one of the containers;

taking the containers, inserted in said elements, and moving the containers inserted in said elements along another conveyor to other machines for further treatments.

2. Method, according to claim 1, wherein the transfer of the containers to the interior of the elements is carried out during the displacement of said housing members, with loading in two steps, first containers and then elements to said housing members, including temporarily separating said containers from the elements.

3. Method according to claim 1, wherein the containers are temporarily kept at a top of the housing members by a horizontal, fixed profile, which extends superposed to a length of the conveyor and partly intersects said housing members, during displacement of the housing members, supporting the containers by their bottom, said profile having an end which allows the containers to drop within the pucks, previously loaded at the bottom of said housing members.

4. Method according to claim 3, wherein the transfer of pucks within the housing members occurs at a point prior to the end of the profile.

5. Method according to claim 1, wherein there are at least two machines, which alternatively load the containers in one or the other of respective adjacent housing members.

6. Plant for carrying unstable containers, said plant comprising:
   means for collecting containers which pass one by one from an exit of one or more automatic positioning machines, said means including housing members which are moving, interfering with said exit, said housing members each prepared to receive one container;
   means for temporarily keeping said containers in an upper part of said housing members;
   means for detecting the existence of a container in said upper part of said housing members;
   means for loading a hollow puck element having a stable bottom in a lower part of said housing members;
   means for transferring each container, thereafter, to an inside of said housing member.

7. Plant according to claim 6, wherein said means for collecting containers consists in a conveyor with a sector interfering with outlets of at least one automatic positioning machine, said conveyor having said plurality of housing members to house the containers including:
   a fixed horizontal profile extending above a length of said conveyor and extending partly in said housing members for a temporary division thereof into two parts, top and bottom, constitutive of said means to transfer containers;
   said means for detecting the existence of a container detects the container at the top of each of said housing members, during displacement;
   means to supply, in the event a container is detected at the top part of the housing member, said hollow puck element having an opening and a recess fit to house said container to the bottom of said housing member;
   shifting means to pick up said hollow puck elements loaded with containers and to transfer the puck element and the container to another conveying line.

8. Plant, according to claim 7, wherein said housing members include a back wall and two side walls having openings directly facing each other which allows partial insertion within the housing member of the horizontal profile including a handrail which actively help to temporarily keep the containers at said top of the housing members.

9. Plant according to claim 7, wherein the means to supply the hollow puck elements to the bottom of the housing members consists in a star having points, a periphery of the star is tangent to the conveyor and of rotation synchronized with a speed of said conveyor, and an endless screw driven by signals from said detecting means for driven introduction of the hollow puck elements to said star, which transfers the hollow suck elements to a related recess.

10. A method for carrying unstable containers, said containers being portioned with a predetermined orientation by at least one automatic position machine, said method comprising:
   discharging the containers one by one from an exit of said at least one positioning machine and picking up of the containers within an upper part of a corresponding housing member of a series of housing members which are moving past said exit;
   detecting the presence of a container within said upper part of said housing member;
   temporarily keeping separate said container from a lower part of said housing;
   loading a hollow puck element having a stable bottom in said lower part of said housing element when a container has been detected in said upper part;
   transferring the containers from said upper part of said housing members to an inside of said hollow puck element; and
   picking up said hollow puck elements, including a container, from said housing members, and moving each hollow puck element with a container to other machines for further treatment.

11. Method according to claim 10, wherein at least two machines are used, which alternatively load containers in one or the other of respective adjacent housing members.

12. Method as claimed in claim 10, wherein said temporarily keeping said container separate from the lower part of said housing member is done by supporting said container by a fixed profile on which said container slides, drawn by said housing members which are moving.

13. Method as claimed in claim 12, wherein said container transfer of said container from said upper part of said housing member to the inside of said hollow puck element is produced by an interruption of said fixed profile at a predetermined position along a path of said housing members which are moving.

14. Method, according to claim 13, wherein:
   said housing members are associated with an endless conveyor, which includes a sector passing by said exit of said at least one machine; and
   said detection of the presence of a container within each of said housing members is preformed after passing said exit of said at least one machine.

15. Method according to claim 13, wherein said temporarily keeping said container separate from the lower part of said housing member is obtained by a horizontal, fixed profile, which extends superposed to one conveyor length and partly extends into said housing members during displacement of said housing member, said profile having a terminal end at which point containers drop into said hollow puck elements, the hollow puck elements having previously been loaded at the lower part of said housing members.

16. Method according to claim 15, wherein said loading of said hollow puck elements within the lower part of said housing members occurs at a point prior to the end of said profile.

* * * * *